(12) United States Patent
Jamtveit et al.

(10) Patent No.: US 9,304,269 B2
(45) Date of Patent: Apr. 5, 2016

(54) SUBSEA CABLE TERMINATION ASSEMBLY, SUBSEA CONNECTOR AND METHOD

(71) Applicants: Endre Fosso Jamtveit, Kongsberg (NO); Trond Holger Villmark, Kongsberg (NO)

(72) Inventors: Endre Fosso Jamtveit, Kongsberg (NO); Trond Holger Villmark, Kongsberg (NO)

(73) Assignee: Siemens Aktiengesellschaft, München (DE)

( * ) Notice: Subject to any disclaimer, the term of this patent is extended or adjusted under 35 U.S.C. 154(b) by 2 days.

(21) Appl. No.: 14/042,589

(22) Filed: Sep. 30, 2013

(65) Prior Publication Data

US 2014/0093247 A1 Apr. 3, 2014

(30) Foreign Application Priority Data

Oct. 1, 2012 (EP) .................................... 12186843

(51) Int. Cl.
| | |
|---|---|
| *G02B 6/44* | (2006.01) |
| *G02B 6/42* | (2006.01) |
| *G02B 6/38* | (2006.01) |
| *H02G 15/14* | (2006.01) |
| *F16L 1/12* | (2006.01) |
| *H04B 10/80* | (2013.01) |

(52) U.S. Cl.
CPC ................ *G02B 6/4278* (2013.01); *F16L 1/12* (2013.01); *G02B 6/3816* (2013.01); *H02G 15/14* (2013.01); *H04B 10/80* (2013.01); *G02B 6/4427* (2013.01); *G02B 6/4428* (2013.01)

(58) Field of Classification Search
CPC ............................ G02B 6/4427; G02B 6/4428
USPC .................................................. 385/100, 101
See application file for complete search history.

(56) References Cited

U.S. PATENT DOCUMENTS

| 6,161,618 A * | 12/2000 | Parks ................... E21B 33/0355 |
| | | 137/236.1 |
| 6,442,304 B1 * | 8/2002 | Crawley et al. .................. 385/12 |
| 6,538,198 B1 * | 3/2003 | Wooters .......................... 174/47 |
| 2003/0228783 A1 * | 12/2003 | Cairns et al. .................... 439/204 |
| 2006/0188202 A1 * | 8/2006 | Deans ............................ 385/100 |
| 2008/0003868 A1 * | 1/2008 | Cairns ............................ 439/552 |
| 2011/0280538 A1 * | 11/2011 | Durrant et al. ................. 385/138 |

FOREIGN PATENT DOCUMENTS

| EP | 2354440 | 8/2011 |
| JP | 58-136009 | 8/1983 |
| WO | 2009008738 | 1/2009 |
| WO | 2013028446 | 2/2013 |

OTHER PUBLICATIONS

European Search Report in EP12186843.4, dated Apr. 3, 2014.

* cited by examiner

*Primary Examiner* — Eric Wong
*Assistant Examiner* — Mary A El Shammaa
(74) *Attorney, Agent, or Firm* — Lempia Summerfield Katz LLC

(57) ABSTRACT

A subsea cable termination assembly for a subsea cable that includes an optical fiber for data transmission is provided. The subsea cable termination assembly includes a chamber that has a liquid tight seal against an ambient medium surrounding the subsea cable termination assembly, and a media converter arranged in the chamber. The media converter includes an optical interface adapted to be connected to an optical fiber of the subsea cable, and an electrical interface. The subsea cable termination assembly also includes an electric contact arranged outside the chamber and electrically connected to the electrical interface of the media converter arranged inside the chamber.

22 Claims, 5 Drawing Sheets

SUBSEA CABLE TERMINATION ASSEMBLY, SUBSEA CONNECTOR AND METHOD

This application claims the benefit of EP 12186843.4, filed on Oct. 1, 2012, which is hereby incorporated by reference.

FIELD

The present embodiments relate to a subsea cable termination assembly for a subsea cable.

BACKGROUND

Due to the increasing energy demands, offshore oil and gas production is moving into deeper waters. For providing an efficient and secure production, processing facilities are being installed at the ocean floor. Such subsea installations may include a range of components, including pumps, compressors and the like, as well as a power grid for operating the components. The power grid may, for example, include a subsea transformer, subsea switchgear and subsea variable speed drives. The components of the subsea installation are to be protected from the surrounding seawater, in which pressures of 300 bar or more may prevail (e.g., at installation depths of 3,000 m or more).

Components of such subsea installations may include electronic equipment that may be monitored and/or controlled from a topside installation, such as a topside control system that may be located on a fixed or floating vessel (e.g., a ship or a platform) or may be based onshore. The subsea installation may, for example, include one or more subsea control modules (SCM) that may receive commands from the topside installation or may transmit information to the topside installation. The one or more SCMs may communicate with each other or may interface a sensor.

In such systems, communication links may be provided between the sensors and the subsea control modules, as well as between the subsea control modules and a topside installation. Communication may, for example, be implemented by a network communication (e.g., Ethernet). Although such type of communication link may achieve relatively high bandwidth (e.g., 10 Mbps, 100 Mbps or even 1 Gbps), such types of communication links are limited in physical length. As an example, Ethernet based on a twisted copper wire pair has a limited length of about 100 m according to Ethernet standards. Enhanced solutions may achieve distances exceeding 150 meters length of the communication link. In general, communication using such type of technology is thus limited to subsea control modules of the same Christmas tree. A communication between different Christmas trees may not be provided, as each installation uses their own link to a topside installation via an umbilical or the like.

Also, it is desirable to retrieve modules from a subsea installation or to install new modules or to exchange modules. Consequently, subsea equipment may be connected and disconnected from power and communication links. For this purpose, wet mateable connectors may be provided. Such connectors are relatively complex and cost intensive to design and produce.

It is desirable to extend the distance over which subsea communication may occur, while maintaining a high bandwidth. For example, it is desirable to enable communication between different Christmas trees. At the same time, it is desirable to keep system complexity relatively low and to limit the complexity that is added to the system. Also, such communication links are to be connectable and disconnectable under water while keeping maintenance low and reliability high.

SUMMARY AND DESCRIPTION

The scope of the present invention is defined solely by the appended claims and is not affected to any degree by the statements within this summary.

There is the need for improving communication links in a subsea installation. The present embodiments may obviate one or more of the drawbacks or limitations in the related art. For example a high bandwidth communication link for longer distances that may be easily connected and disconnected subsea, while maintaining system complexity relatively low is provided.

An embodiment provides a subsea cable termination assembly for a subsea cable. The subsea cable includes an optical fiber for data transmission. The subsea cable termination assembly includes a chamber that has a liquid tight seal against an ambient medium surrounding the subsea cable termination assembly and a media converter arranged in the chamber. The media converter has an optical interface adapted to be connected to an optical fiber of the subsea cable. The media converter also includes an electrical interface. The subsea cable termination assembly also includes an electric contact arranged outside the chamber and electrically connected to the electrical interface of the media converter arranged inside the chamber. The media converter is adapted to receive data on one interface of the electrical interface and the optical interface and to transmit corresponding data on the other interface of the electrical interface and the optical interface.

By making use of an optical interface of the media converter for data transmission over the subsea cable, the distance over which the data may be transmitted may be increased significantly compared to data transmission by twisted copper wires. Since an electric contact is provided for interfacing other subsea components, such as subsea devices, subsea connectors or the like, an electric connector may be used together with the subsea cable termination assembly for connecting the subsea cable to subsea equipment. Reliable and field proven technologies exist for electric subsea connectors, so that the connector may have a relatively low complexity and may be made cost efficiently. For example, no new wet mateable subsea optical connector is required.

In embodiments, the electrical interface may be connected to plural electric contacts arranged outside the chamber. Also, the subsea cable may include plural optical fibers for data transmission, and the optical interface of the media converter may connect to these plural optical fibers. The electric contact may be an electric terminal of a connector of the subsea cable. The media converter may effectively convert a received optical signal into an electric signal for transmission, or a received electrical signal into an optical signal for transmission. For the transmission of data by electrical signals or optical signals, different transmission protocols may be used, and the media converter may be adapted to convert between such protocols. The electrical signal and the optical signal may correspond to one or more individual data packets.

In an embodiment, the chamber may be a pressure resistant chamber adapted to maintain an inside pressure between about 0.5 and about 5 bar (e.g., maintain an inside pressure that is close to atmospheric pressure). Such configuration may have the advantage that conventional electric and electronic components may be used in the media converter. A compact and relatively low cost design of the subsea cable termination assembly will thus be achieved.

The subsea cable termination assembly may also include a fiber optic penetrator for providing an optical connection through a wall of the chamber. The fiber optic penetrator may provide a pressure resistant and liquid tight seal. Using such fiber optic penetrator, the optical fibers of the subsea cable may be fed through the wall of the chamber even if there is a relatively large pressure difference between inside the chamber and outside the chamber. As an example, when the inside of the chamber is kept at about 1 bar, and the subsea cable termination assembly is installed in a depths of water of about 3,000 meters, a pressure difference between inside and outside of the chamber of close to 300 bar may exist.

The subsea cable termination assembly may also include an electrical penetrator for providing an electric connection through a wall of the chamber. The electrical penetrator may provide a pressure resistant and liquid tight seal. Similarly, such electrical penetrator may enable an electric connection through a wall of the chamber while maintaining a liquid tight seal, even if pressure differences in excess of 300 bar between inside and outside of the chamber exist.

In another embodiment, the chamber may be filled with a dielectric liquid and may be pressure compensated against an ambient pressure. The pressure inside the chamber may thus essentially be balanced to the pressure in a medium surrounding the subsea cable termination assembly (e.g., surrounding seawater). In such configuration, the pressure differences between inside and outside of the chamber may be kept small. Pressure tolerant electric and electronic components may be used for the media converter. In other embodiments, electric or electronic components of the media converter may be embedded in a material that provides a liquid tight barrier and is capable of withstanding such high ambient pressures.

In an embodiment, the media converter may include a power supply interface for receiving electric power for operation. The subsea cable termination assembly may include one or more further electrical contacts outside the chamber that are electrically connected to the power supply interface. The further electrical contacts may, for example, be electrical terminals of a connector or may be connected to electrical terminals of a connector. Via such connector, the media converter may thus be supplied with electric power for operation.

In an embodiment, the media converter may further include a monitoring interface for providing information about at least an optical link established via the optical interface. The monitoring interface may be accessible via the electric contact (e.g., may correspond to a software interface accessible via data transmission over the electrical interface), or via one or more further electrical contacts provided outside the chamber and electrically connected to the monitoring interface. Again, the additional electrical contacts may be or may be connected to electric terminals of a connector, so that via such connector, the status of the optical link may be monitored.

Via the monitoring interface, transmitted and received optical power may, for example, be monitored. Corresponding electric signals may be transmitted by the media converter via the monitoring interface. In other configurations, the optical link status may simply be monitored, such as link OK, fail or link activity.

In an embodiment, the media converter may include electronic components, and at least some of the electronic components (e.g., all of the electronic components) are molded into a material, such as a plastic material or a resin. For example, electronic components of the media converter may be molded into epoxy resin. This way, the electronic components may be protected from their environment (e.g., from a dielectric liquid that may at least partly fill the chamber, or from pressure if the chamber is pressure compensated against the ambient medium or is pressurized).

In some embodiments, the electrical contact may be a pin or an electrical socket of a subsea connector. This may also apply to the one or more electrical contacts connected to the power supply interface or the monitoring interface and to other electric contacts that are electrically connected to the media converter. For example, the electrical contact may be a male or a female electric contact, depending on the configuration.

In an embodiment, the media converter is an Ethernet media converter. Such Ethernet media converter may work according to any known Ethernet standard such as IEEE 802.3.

In some embodiments, the subsea cable termination assembly may include one or more further electric contacts that are electrically connected to respective electric conductors, provided in the subsea cable. Thereby, one or more electric connections that bypass the media converter may be provided. This way, electrical data and/or power transmission may be provided via the subsea cable. As an example, this may be a low bandwidth electric data transmission. Also, since the optical fiber of the subsea cable is available for data transmission, interference by an additional transmission of electric power may be kept low.

The chamber of the subsea cable termination assembly in which the media converter is arranged may have a cylindrical shape. As an example, the chamber may have an inner longitudinal dimension between about 50 mm and about 200 mm. The chamber may also have an inner lateral dimension between about 25 mm and about 60 mm. As an example, a cylindrical chamber having a length of 150 mm and a base diameter of about 45 mm may be used.

In an embodiment, the chamber is provided by a metal housing, such as a steel housing. The housing has an opening towards the subsea cable. The opening includes a fiber optic penetrator. The housing also includes a further opening towards a subsea connector attachable to the housing. The further opening includes an electrical penetrator. The housing may, for example, have an interface, such as an NK2 interface, for mounting a subsea connector. On the opposite side of the housing, the subsea cable may be attached to the housing.

The subsea cable termination assembly may also include a fill/vent port for the subsea cable. For example, if the subsea cable includes a liquid filled hose, in which the optical fibers are arranged, such port may be used to fill or vent the liquid filled hose.

A further embodiment provides a subsea connector. The subsea connector includes a connector element, such as a receptacle or a plug, for mechanical and electrical engagement (e.g., with another connector, or with a socket or jack on a subsea component or the like). The subsea connector also includes a subsea cable termination assembly in accordance with any of the above described embodiments. The electrical contact of the subsea cable termination assembly is a pin or an electrical socket of the connector element. Such subsea connector may enable a relatively simple connection and disconnection of the subsea cable at a subsea installation, and may enable a data transmission with high bandwidth over long distances.

In an embodiment, the connector element may include a receptacle, and the electronic contact may be a pin arranged inside the receptacle. In another embodiment, the connector element may include a plug, and the electrical contact may be an electrical socket arranged inside the plug. Other configurations may also be provided.

The subsea cable termination assembly may be mechanically mounted to the connector element. The subsea cable termination assembly may be arranged between the connector element and the subsea cable.

A further embodiment provides a subsea cable assembly that includes a subsea cable including one or more optical fibers for data transmission and a subsea connector in any of the above outlined configurations. The cable termination assembly of the subsea connector terminates the subsea cable at an end of the subsea cable and provides an optical connection of the one or more optical fibers to the media converter. Such subsea cable assembly may enable an optical transmission of data at relatively high bandwidth over considerable distances (e.g., in excess of 1 kilometer). For example, such subsea cable assembly may enable a communication between different Christmas trees of a subsea installation. It is thus not necessary to have at each Christmas tree an umbilical to a topside installation, which may result in considerable cost reductions, since umbilicals may be very expensive. With the subsea cable assembly, advantages similar to the ones outlined further above may be achieved.

In an embodiment, the subsea cable includes a hose filled with a dielectric liquid. The one or more optical fibers are arranged inside the hose. The hose is flexible to provide pressure compensation between the interior of the hose and an ambient medium. Such a fluid filled hose (e.g., an oil filled hose) may be used in a subsea cable that is operable down to water depths in excess of 3,000 meters. The optical fibers and/or the hose may be terminated at the subsea cable termination assembly, and the fiber optic penetrator may lead the optical fibers from inside the hose through the wall of the chamber so that the optical fibers may be connected to the optical interface of the media converter. The termination assembly may include a fill/vent port for filling or venting the hose.

Another embodiment provides a subsea data communication method, including providing a subsea connector on a subsea cable. The subsea connector includes a connector portion with an electrical contact. The subsea connector includes a media converter having an electrical interface electrically connected to the electrical contact and an optical interface connected to an optical fiber of the subsea cable. The method also includes receiving data on one interface of the electrical interface and the optical interface of the media converter, and transmitting corresponding data on the other interface of the electrical interface and the optical interface of the media converter. The media converter thus essentially performs a conversion of data received as an electrical signal into data to be transmitted as an optical signal and/or vice versa. The media converter may also convert the data from one data transmission protocol to another data transmission protocol.

With such method, advantages similar to the ones outlined above may be achieved. The method may be performed with a subsea cable termination assembly, a subsea connector or a subsea cable assembly in any of the above outlined configurations.

The features of the embodiments described above and those yet to be explained below may be combined with each other unless noted to the contrary.

BRIEF DESCRIPTION OF THE DRAWINGS

In the drawings, like reference numerals refer to like elements.

DETAILED DESCRIPTION

In the following, embodiments illustrated in the accompanying drawings are described in more detail. The following description is only illustrative and non restrictive. The drawings are only schematic representations, and elements in the drawings are not necessarily to scale with each other.

Figure 1:
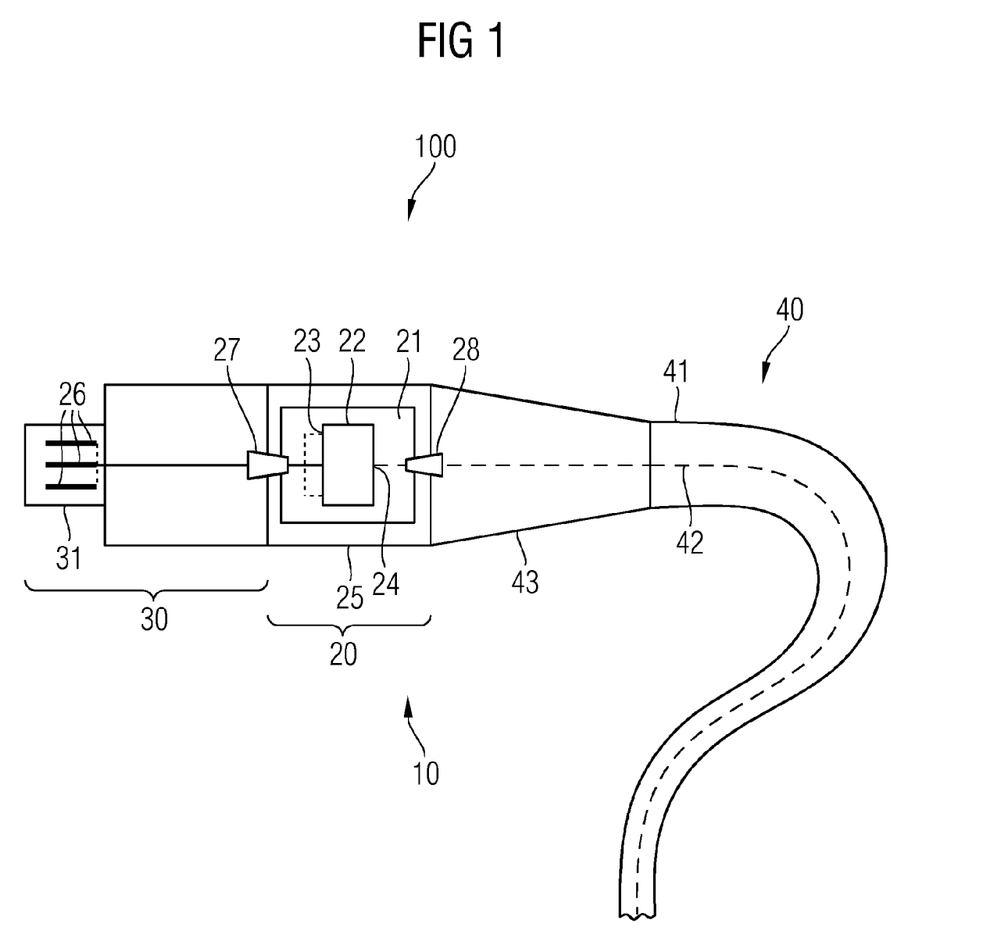
FIG. 1 is a schematic diagram showing a sectional side view of one embodiment of a subsea connector including a subsea cable termination assembly.

FIG. 1 shows one embodiment of a subsea cable assembly 100 including a subsea connector 10 and a subsea cable 40. The subsea connector 10 includes a subsea cable termination assembly 20 and a connector portion 30. Although the subsea cable termination assembly 20 and the connector portion 30 are shown as separate elements, the subsea cable termination assembly 20 and the connector portion 30 may in other embodiments be parts of a subsea connector and may not be separable.

The subsea connector 10 may be implemented as a male or a female connector. In the embodiments described hereinafter, the subsea connector 10 is a wet mateable connector, although implementations as a dry mate connector may also be provided. The connector portion 30 includes a connector element 31 that may be a receptacle (in case of a female subsea connector) or may be a plug (in case of a male connector). In the connector element 31, electric contacts 26 are arranged. Depending on the configuration, the electric contacts 26 may be pins or electrical sockets for receiving pins. Other embodiments may use different types of electrical contacts that are known in the art. Using the connector element 31 and the electrical contacts 26, the subsea connector 10 may be mated with another subsea connector or a subsea socket or the like. As an example, a subsea device such as a power or communication distribution unit may have a plurality of sockets mounted thereto. The subsea connector 10 may be brought into engagement with the sockets, so as to establish an electric connection via the electrical contacts 26. Using the subsea cable 40, data and/or electric power may be transmitted to a subsea device connected to the other end of the subsea cable 40 (e.g., using another subsea connector 10). Such device may be a subsea control unit or the like. In other applications, the subsea cable assembly 100 may be used to establish a connection between different subsea control units.

In the embodiment of FIG. 1, the subsea cable 40 is used for data transmission using one or more optical fibers 42. The subsea cable 40 may include a hose 41 that may be filled with a liquid, such as oil, and in which the one or more optical fibers 42 are arranged. The flexibility of such hose allows a pressure compensation of the interior of the subsea cable 40, so that when deployed subsea, the pressure inside the subsea cable 40 is almost equal to the ambient pressure of the seawater. Due to the low differential pressure, the risk of ingress of seawater into the hose 41 is relatively low. Using the liquid filled hose 41, a cost efficient and reliable subsea cable 40 may thus be implemented.

The subsea cable 40 is furthermore provided with a bend restrictor 43 that may be part of the subsea cable termination assembly 20. A crimp sleeve (not shown) may also be provided for attaching the hose 41 to the subsea cable termination assembly 20.

The subsea cable termination assembly 20 enables the use of an electrical connector portion 30 in combination with the optical fiber 42 for data transmission. The subsea cable termination assembly 20 includes a media converter 22 arranged inside a chamber 21. In some embodiments, the chamber 21 is kept at close to atmospheric pressure (e.g., at about 1 bar or about 1.5 bar). In such embodiments, the housing 25 of the subsea cable termination assembly 20 is constructed so as to be capable of withstanding high differential pressures. For example, the subsea cable termination assembly 20 (e.g., an assembly) may be configured so as to be capable of withstanding external pressures in excess of 200 bar or even in excess of 300 bar, while maintaining a close to atmospheric pressure inside the chamber 21. The housing 25 may, for example, be made out of a metal (e.g., of steel) and may be provided with relatively thick walls to withstand high differential pressures.

The media converter 22 may include standard electronic components operable in atmospheric conditions. The media converter 22 has one or more optical interfaces 24 for connecting to one or more optical fibers 42 of the subsea cable 40. The interface and the connection to the optical fibers may be implemented in a variety of ways, depending on the particular needs. Examples are optical connectors or pigtails or the like.

The media converter 22 further includes one or more electrical interfaces 23 that are electrically connected to the one or more electric contacts 26. The electrical connection may, for example, be provided by soldered wires, or the interface 23 at the media converter 22 may include electrical connectors.

For providing the optical connection and the electric connection through the walls of the chamber 21, an electrical penetrator 27 and an optical penetrator 28 are provided. These penetrators are configured to provide a liquid tight seal for the chamber 21 to an ambient medium, so that, for example, liquid from the liquid filled hose 40 or seawater may not enter the chamber 21. The penetrators 27 and 28 are configured to withstand the high differential pressures that may prevail when the subsea connector 10 is installed at subsea location. As an example, a seal may be provided for the optical fiber 42 in optical penetrator 28 using molten glass. For example, the fiber optic penetrator described in the patent application WO 2009/008738 A1 may be used for this purpose. Similarly, for the electrical penetrator 27, an electrical conductor may be embedded in an insulating material, such as a resin or the like, for providing a sealed connection through the walls of the chamber 21.

The media converter 22 provides conversion between an optical signal at optical interface 24 and an electrical signal at the electrical interface 23. The media converter 22 may, for example, convert an electrical signal received via the electric connector 26 and the electric interface 23 into an optical signal that is transmitted via the optical interface 24 on the optical fiber 42. Also, a conversion in the other way may be provided. In one embodiment, the media converter 22 is adapted to convert both from an optical to an electrical signal and from an electrical signal to an optical signal.

The media converter 22 may be an Ethernet media converter. As such, a received optical or electrical signal may correspond to one or more data packets. The data may be received via the electrical or optical signals using different types of data transmission protocols. If the protocols are different for the electrical transmission path via the interface 23 and the optical data transmission path via the optical interface 24, then the media converter 22 may also perform a conversion between the different protocols.

The subsea cable assembly 100 may thus interface copper Ethernet at both ends, but uses fiber optics as a transportation medium.

The media converter 22 may be configured to provide a Ethernet data communication with at least 10 Mbit/s or at least 100 Mbit/s. In some embodiments, a communication may be provided with a data rate of one Gbit/s or more. Also, data communication with 10 Gbit/s or more may be provided.

Since the optical fiber is used for the transmission of data, the subsea cable 40 may extend over a considerable length (e.g., exceeding one kilometer). At the other end of the subsea cable 40, a similar subsea connector 10 may be provided, either as a male or a female connector, depending on the configuration. The media converter of the second subsea connector may again perform a conversion between optical and electrical signals, so as to enable a connection of the other end of the cable by an all electrical connector portion to a subsea device, a subsea distribution unit or to another subsea cable.

The subsea cable assembly 100 enables a high speed communication and the exchange of large amounts of data. The data may be exchanged between different Christmas trees without the need for an umbilical for each Christmas tree, due to the possible length of the subsea cable 40. The connector portion of the subsea connector 10 may be kept relatively simple, since only electrical connections are to be established when mating the connector with a corresponding connector or socket. A well proven wet made connector technology may thus be used. In consequence, the subsea connector 10 may be kept relatively compact and cost efficient.

Figure 2:
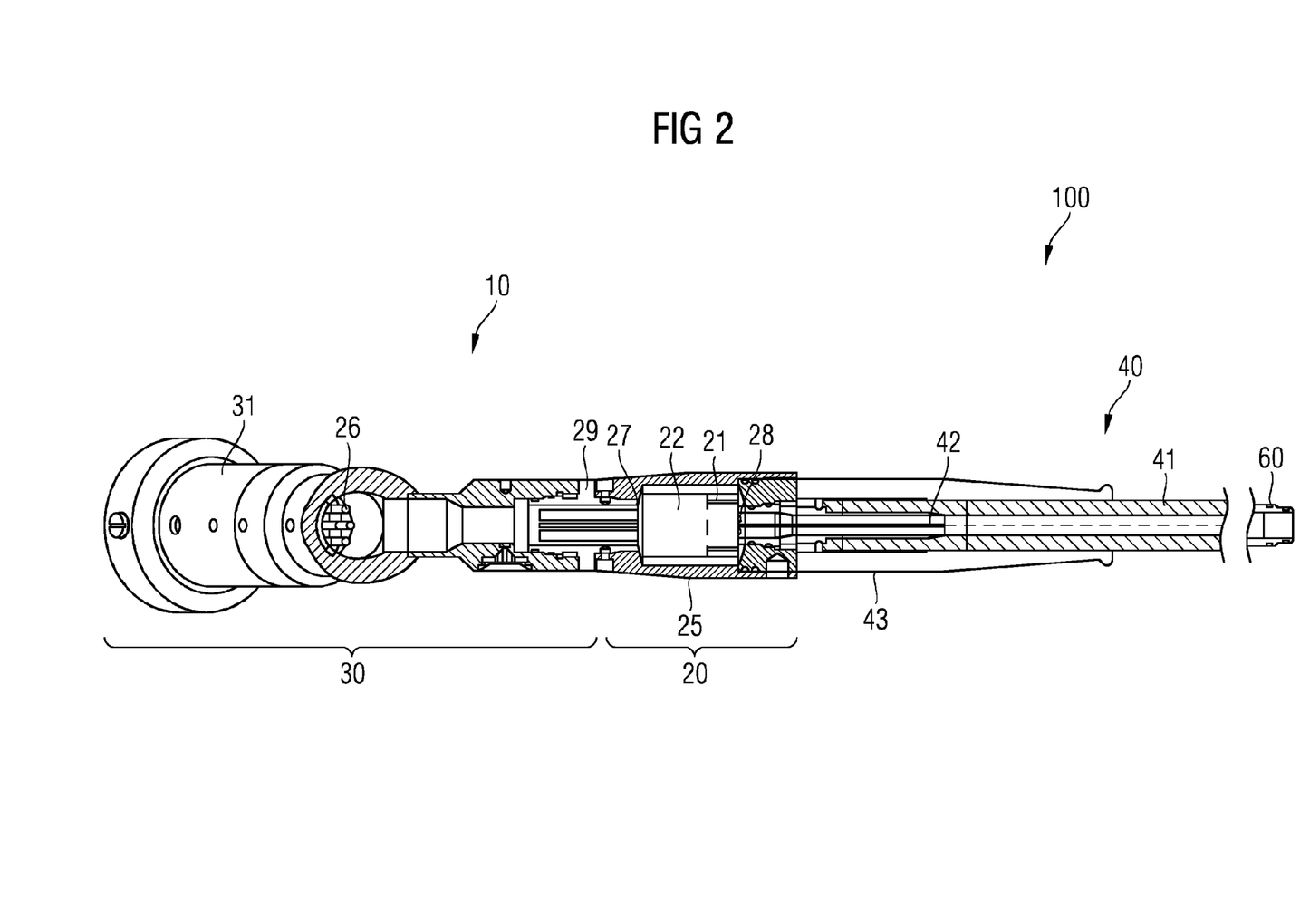
FIG. 2 is a schematic diagram showing a sectional top view of one embodiment of a subsea connector.

FIG. 2 shows an exemplary implementation of the subsea cable assembly 100 including the subsea connector 10 of FIG. 1, so the explanations given above are applicable to the embodiment illustrated in FIG. 2. The subsea cable 40 includes a hose 41 filled with a liquid (e.g., with oil) and the optical fiber 42. The hose is mounted to the subsea cable termination assembly 20 (e.g., by a crimp sleeve), and a bend restrictor 43 is provided for avoiding an excessive bending of the hose conduit 41.

At the end of the subsea cable, a mechanical interface, such as an MK2 interface, may be provided. Via the interface, the subsea cable may be mounted to the assembly 20. In other words, the assembly 20 does not need to terminate the hose 41, but the end of the subsea cable may be provided with a mechanical interface to which the assembly 20 is attached. The assembly 20 may terminate the optical link provided by optical fiber 42. In other embodiments, the assembly 20 may also provide a termination for the subsea cable.

As shown in FIG. 2, the assembly 20 includes a housing 25 in which the media converter 22 is arranged. The fiber optic penetrator 28 is used to feed the optical fiber 42 through a wall of the housing 25 into the chamber 21 in which the media converter 22 is arranged.

The subsea connector 10 further includes the connector portion 30 that is mounted to the assembly 20. For this purpose, the assembly 20 may again be provided with a mechanical interface (e.g., an MK2 interface), towards which the connector portion 30 may be mounted. As an example, an MK2 adapter 29 may be affixed to the housing 25 of assembly 20. The MK2 adapter provides the MK2 interface towards which the connector portion 30 may be mounted, as shown in FIG. 2.

As mentioned above, the assembly 20 includes an electric penetrator 27 that provides an electric connection through a wall of the housing 25 into the chamber 21 for contacting the media converter 22. The penetrator is located in a wall of the housing 25 facing the connector portion 30.

Electric wires may lead from the penetrator through the connector portion 30 to the electric contacts 26 (e.g., pins, electrical sockets or the like), towards which the electric wires are connected (e.g., by soldering or the like). FIG. 2 shows the rear ends of the electric contacts 26, where the front ends reach through into the connector element 31.

In the example of FIG. 2, the connector element 31 is a receptacle that may be engaged with another subsea connector or subsea socket having a plug-type connector element. In the embodiment of FIG. 2, the electric contacts 26 may be pins that are protected by the receptacle 31.

As mentioned above, additional electrical connections may be provided in the subsea cable assembly 100, which may bypass the media converter 22 (e.g., for providing an electric connection for power supply or for providing a data connection using data transmission by electrical signals such as for legacy systems).

The subsea connector 10 may include a number of electrical contacts 26 connected to the media converter 22. Among these may be contacts for data transmission (e.g., connected to the electrical interface 23 of the media converter 22), for power supply and for monitoring. Between 2 and 20 electrical contacts 26 may, for example, be provided (e.g., 12). In some embodiments, the media converter 22 may be adapted to monitor the optical link (e.g., by measuring received/transmitted optical power, determining link status or the like). One or more of the electric contacts 26 may be employed to transmit such monitoring data to a device connected to the subsea connector 10, where the monitoring data may be evaluated and/or communicated to a topside installation (e.g., on a vessel or platform, or onshore). These may be dedicated electric contacts, or the monitoring data may be transmitted using the electrical interface for data transmission. In other words, an Ethernet connection provided by electrical contacts 26 may, for example, be used to transmit the monitoring data.

In other embodiments, the assembly 20 (e.g., the media converter 22) may include a microprocessor for evaluating such monitoring data. Such data may be used to control the media converter (e.g., by adjusting the optical data transmission), and/or may be communicated to another device or a topside installation via the electrical interface for data communication or via dedicated electrical contacts, as mentioned above.

In FIG. 2, reference numeral 60 denotes a termination of the subsea cable 40 at the other end thereof (e.g., by another MK2 interface). This termination 60 may be attached to a corresponding subsea connector 10 including an assembly 20 and a connector portion 30, or the termination 60 may be directly mounted to a subsea device. Other possibilities include the mounting of a dry mate connector to the subsea cable end, which may have optical contacts or may be provided with an assembly similar to the assembly 20 including a media converter. The configuration of the subsea cable assembly 100 depends on the particular application in which the subsea cable assembly 100 is to be used.

Figure 3:
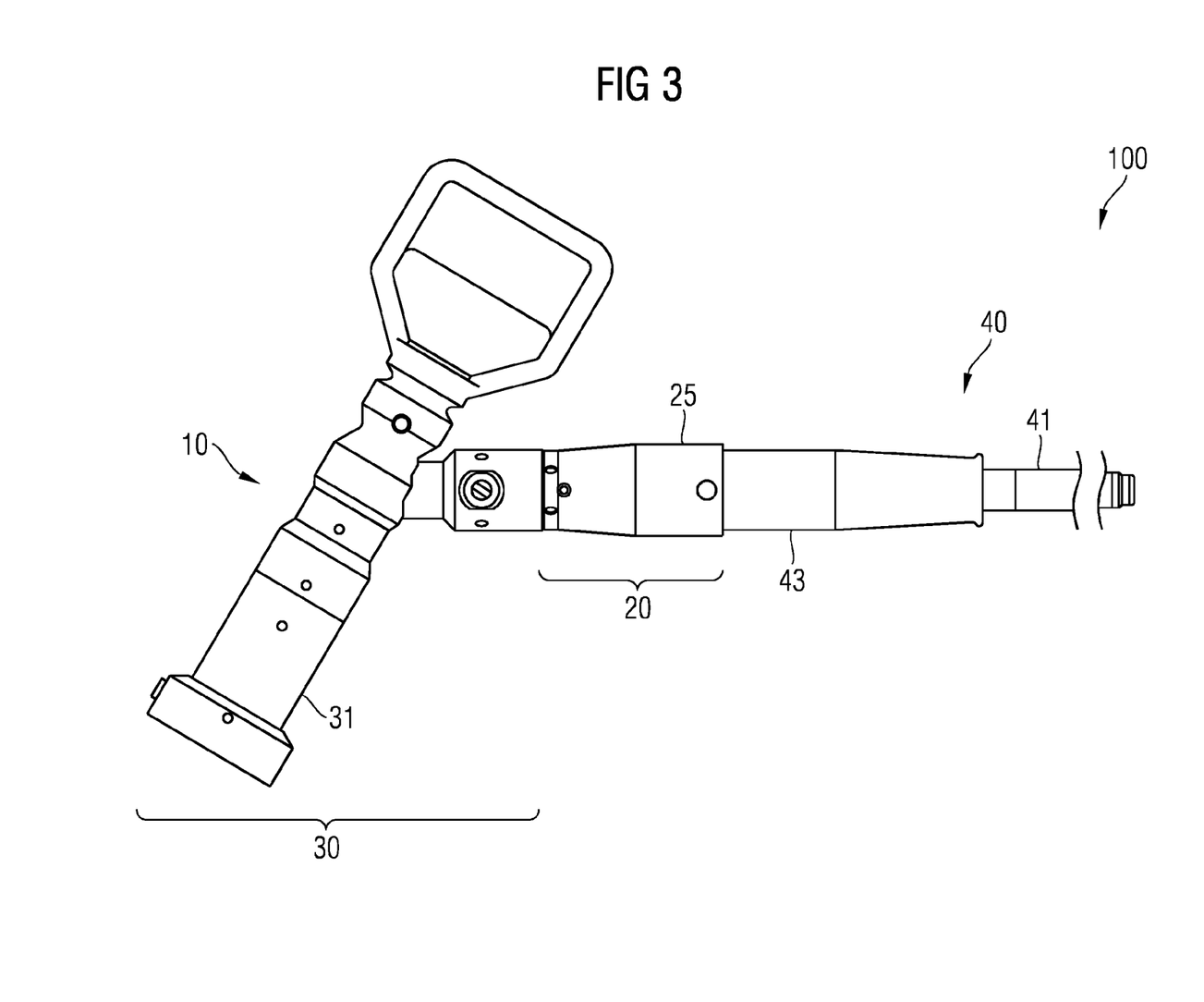
FIG. 3 is a schematic diagram showing a side view of one embodiment of the subsea connector of FIG. 2.

FIG. 3 is a side view of one embodiment of the subsea connector 10 of FIG. 2. Since this is not a sectional view, the electric contacts 26 are hidden within the receptacle 31 of the connector portion 30. The housing 25 of the assembly 20 is arranged between the connector portion 30 and the subsea cable 40, and the bend restrictor 43 is firmly mounted to the housing 25. The housing 25 may, for example, have an axial extension between about 50 mm and about 200 mm. A largest outer diameter may lie within the range of about 30 mm to about 100 mm. In the illustrated example, the axial extension is about 100 mm, and the diameter is about 50 mm (e.g., about 52 mm). The housing 25 has an overall cylindrical shape, with a frusto-conical portion at the end facing the connector portion 30.

Figure 4:
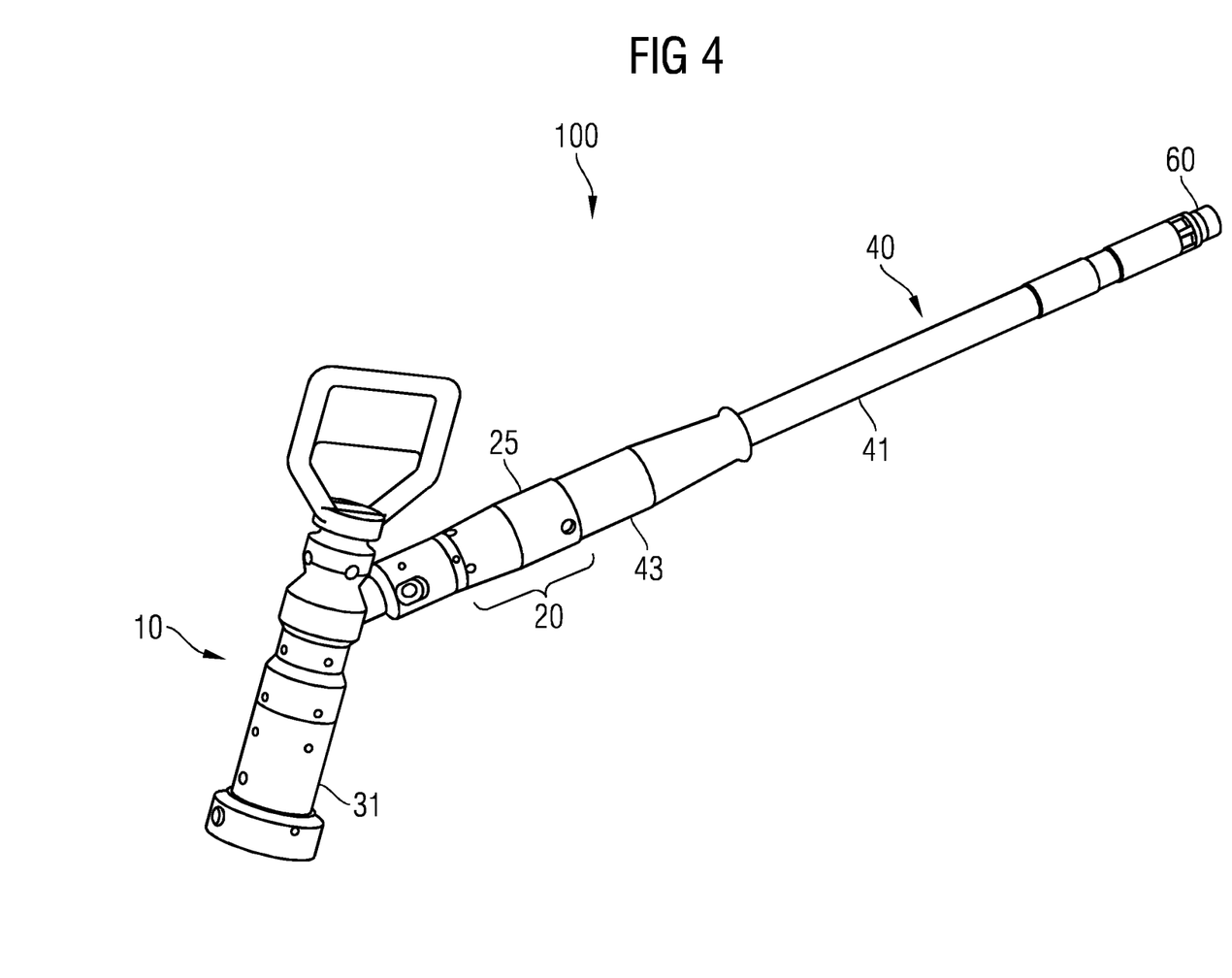
FIG. 4 is a schematic diagram showing a perspective view of one embodiment of the subsea connector of FIG. 2.

FIG. 4 shows a perspective view of one embodiment of the subsea cable assembly 100 including the subsea connector 10 of FIGS. 2 and 3. The length of the subsea cable 40 is reduced for the purpose of illustration, and the actual length may extend over more than 1 km, since the optical fiber 42 is used for data transmission.

Figure 5:
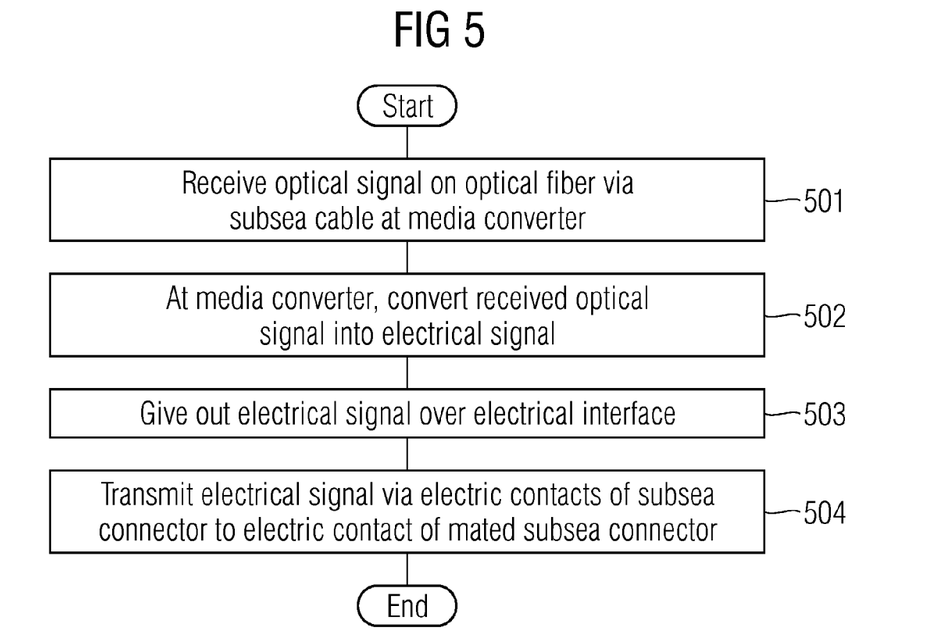
FIG. 5 is a flow diagram of a method according to an embodiment.
Figure 6:
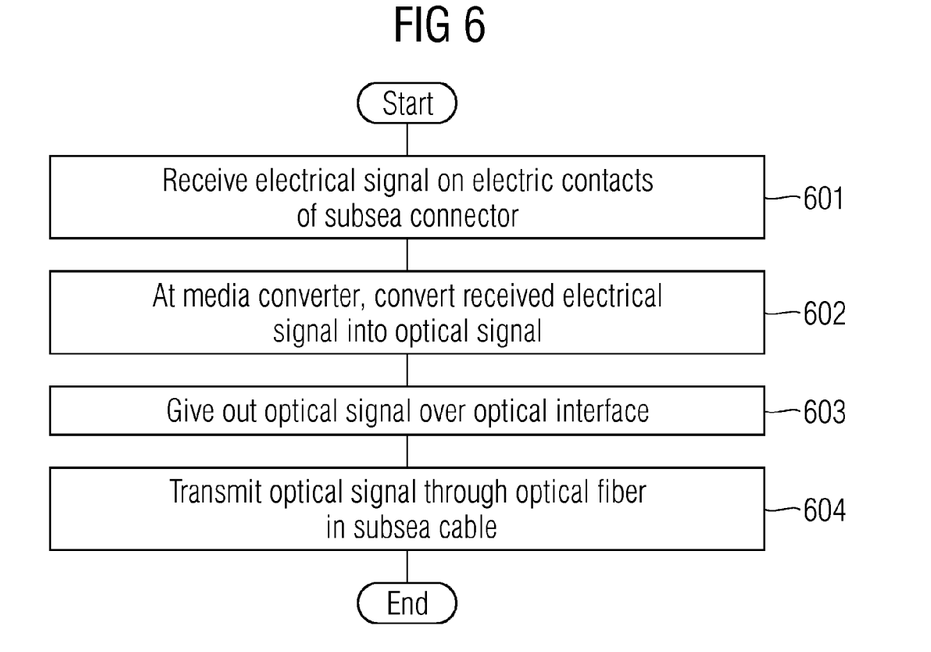
FIG. 6 is a flow diagram of a method according to an embodiment.

FIGS. 5 and 6 are flow diagrams of methods that may be performed by the assembly 20 of any of the above outlined embodiments. In FIG. 5, a data transmission is received on the optical fiber 42 and transmitted via the electric contacts 26 of the subsea connector 10, while in FIG. 6, a data transmission is received via the electrical contacts 26 of the subsea connector 10 and transmitted through the optical fiber 42.

In act 501 of FIG. 5, an optical signal corresponding to a data transmission (e.g., one or more data packets) is received via the optical fiber of the subsea cable at the optical interface of the media converter. The received optical signal is converted into an electrical signal by the media converter (act 502). The conversion of the signal may include a change in the data transmission protocol (e.g., by packaging the contents of a data packet received via the optical fiber into a new data packet according to a different protocol for transmission via the electrical interface). The media converter then generates an electrical signal corresponding to the new data packet. In other embodiments, only the signal itself may be converted, without affecting the packaging of data.

In act 503, the electrical signal generated by the media converter is given out over the electrical interface. The electrical signal is transmitted via the electric contacts 26 to the electric contacts of a mated subsea connector or socket (act 504). The electrical signal may be received by a receiver (e.g., a network card) of a device to which the socket is mounted, or may be transmitted further by another subsea cable or an umbilical or the like.

The flow diagram of FIG. 6 illustrates a corresponding method that operates in reverse direction. The explanations given above are thus applicable with the necessary changes. In act 601, the electrical signal is received on the electric contacts 26 of the subsea connector 10, and is thus received at the electrical interface 23 of the media converter 22. In act 602, the electrical signal is converted into an optical signal by the media converter 22. The optical signal is given out via the optical interface 24 of the media converter 22 (act 603). The optical signal is transmitted by the optical fiber 42 of the subsea cable (act 604). The other end of the subsea cable at which the optical signal is received may include a similar subsea connector 10 that may perform the method described with respect to FIG. 5 on the received optical signal (e.g., the subsea connector 10 may convert the optical signal into an electrical signal that is given out at the electrical contacts). The subsea cable assembly may thus interface copper Ethernet at both ends, but uses fiber optics as a transportation medium.

Embodiments provide ways for transmitting data subsea at high bandwidth over considerable distances. For example, the data may be transmitted between different Christmas trees that may be spaced apart by more than 1 km. The subsea cable assemble may be connected/disconnected subsea with wet mateable connectors without the need to provide a wet mateable optical connection. The complexity of the connector portions may thus be maintained and does not need to be increased.

While specific embodiments are disclosed herein, various changes and modifications may be made without departing from the scope of the invention. The present embodiments are to be considered in all respects as illustrative and non restrictive, and all changes coming within the meaning and equivalency range of the appended claims are intended to be embraced therein.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A subsea cable termination assembly for a subsea cable that includes an optical fiber for data transmission, the subsea cable termination assembly comprising:
    a chamber that has a liquid tight seal against an ambient medium surrounding the subsea cable termination assembly;
    a media converter arranged in the chamber, the media converter comprising an optical interface and an electrical interface, the media converter configured to convert an optical signal received via the optical interface into an electrical signal and configured to convert an electrical signal received via the electrical interface into an optical signal, the optical interface being connectable to the optical fiber of the subsea cable; and
    an electric contact arranged outside the chamber and electrically connected to the electrical interface of the media converter arranged inside the chamber,
    wherein the media converter is configured to receive a signal of the optical signal and the electrical signal on one interface of the electrical interface and the optical interface and to transmit the converted signal on the other interface of the electrical interface and the optical interface, and
    wherein the media converter further comprises a monitoring interface configured to provide information about at least an optical link established via the optical interface, the monitoring interface being accessible via the electric contact or via one or more further electrical contacts provided outside the chamber and electrically connected to the monitoring interface.

2. The subsea cable termination assembly of claim 1, wherein the chamber is a pressure resistant chamber adapted to maintain an inside pressure between 0.5 and 5 bar.

3. The subsea cable termination assembly of claim 1, further comprising a fiber optic penetrator operable to provide an optical connection through a wall of the chamber, the fiber optic penetrator operable to provide a pressure resistant and liquid-tight seal.

4. The subsea cable termination of claim 1, further comprising an electrical penetrator operable to provide an electric connection through a wall of the chamber, the electrical penetrator operable to provide a pressure resistant and liquid-tight seal.

5. The subsea cable termination assembly of claim 1, wherein the media converter further comprises a power supply interface configured to receive electric power for operation, and
    wherein the subsea cable termination assembly comprises the one or more further electrical contacts outside the chamber and electrically connected to the power supply interface.

6. The subsea cable termination assembly of claim 1, wherein the media converter comprises electronic components, and
    wherein at least some of the electronic components are molded into a material.

7. The subsea cable termination assembly of claim 6, wherein the material is a plastic material or a resin.

8. The subsea cable termination assembly of claim 7, wherein the material is an epoxy resin.

9. The subsea cable termination assembly of claim 1, wherein the media converter is an Ethernet media converter.

10. The subsea cable termination assembly of claim 1, further comprising one or more further electric contacts electrically connected to respective electric conductors provided in the subsea cable, thereby providing one or more electric connections bypassing the media converter for providing electrical data, power transmission, or the electrical data and the power transmission via the subsea cable.

11. The subsea cable termination assembly of claim 1, wherein the chamber is provided by a metal housing, the metal housing comprising a first opening towards the subsea cable and a second opening towards a subsea connector portion attachable to the metal housing, the first opening comprising a fiber optic penetrator, the second opening comprising an electrical penetrator.

12. The subsea cable termination assembly of claim 11, wherein the metal housing is a steel housing.

13. A subsea connector comprising:
    a connector element for mechanical and electrical engagement; and
    a subsea cable termination assembly for a subsea cable that includes an optical fiber for data transmission, the subsea cable termination assembly comprising:
        a chamber that has a liquid tight seal against an ambient medium surrounding the subsea cable termination assembly;
        a media converter arranged in the chamber, the media converter comprising an optical interface and an electrical interface, the media converter configured to convert an optical signal received via the optical interface into an electrical signal and configured to convert an electrical signal received via the electrical interface into an optical signal, the optical interface being connectable to the optical fiber of the subsea cable; and
        an electric contact arranged outside the chamber and electrically connected to the electrical interface of the media converter arranged inside the chamber,
        wherein the media converter is configured to receive a signal of the optical signal and the electrical signal on one interface of the electrical interface and the optical interface and to transmit the converted signal on the other interface of the electrical interface and the optical interface, wherein the electric contact of the subsea cable termination assembly is a pin or an electrical socket of the connector element, and wherein the media converter further comprises a monitoring interface configured to provide information about at least an optical link established via the optical interface, the monitoring interface being accessible via the electric contact or via one or more further electrical contacts provided outside the chamber and electrically connected to the monitoring interface.

14. The subsea connector of claim 13, wherein the connector element is a receptacle or plug.

15. The subsea connector of claim 13, wherein the subsea cable termination assembly is mechanically mounted to the connector element and is arranged between the connector element and the subsea cable.

16. A subsea cable assembly comprising:
a subsea cable including one or more optical fibers for data transmission;
a subsea connector comprising:
 a connector element for mechanical and electrical engagement; and
 a subsea cable termination assembly for the subsea cable, the subsea cable termination assembly comprising:
  a chamber that has a liquid tight seal against an ambient medium surrounding the subsea cable termination assembly;
  a media converter arranged in the chamber, the media converter comprising an optical interface and an electrical interface, the media converter configured to convert an optical signal received via the optical interface into an electrical signal and configured to convert an electrical signal received via the electrical interface into an optical signal, the optical interface being connectable to the optical fiber of the subsea cable; and
  an electric contact arranged outside the chamber and electrically connected to the electrical interface of the media converter arranged inside the chamber,
wherein the media converter is configured to receive a signal of the optical signal and the electrical signal on one interface of the electrical interface and the optical interface and to transmit the converted signal on the other interface of the electrical interface and the optical interface,
wherein the electric contact of the subsea cable termination assembly is a pin or an electrical socket of the connector element,
wherein the cable termination assembly of the subsea connector is attached to the subsea cable at an end of the subsea cable and provides an optical connection of the one or more optical fibers to the media converter, and
wherein the chamber is filled with a dielectric liquid and is pressure compensated against an ambient pressure.

17. The subsea cable assembly of claim 16, wherein the subsea cable termination assembly is mechanically mounted to the connector element and is arranged between the connector element and the subsea cable.

18. A subsea data communication method comprising:
providing a subsea connector on a subsea cable, the subsea connector comprising a subsea cable termination assembly, the subsea cable termination assembly comprising a connector portion, a chamber that has a liquid tight seal against an ambient medium surrounding the subsea cable termination assembly, and a media converter arranged in the chamber, the connector portion comprising an electrical contact, the media converter comprising an electrical interface, and an optical interface, the media converter configured to convert an optical signal received via the optical interface into an electrical signal and configured to convert an electrical signal received via the electrical interface into an optical signal, the optical interface being connected to an optical fiber of the subsea cable, the electrical contact being arranged outside the chamber and being electrically connected to the electrical interface of the media converter arranged inside the chamber, the chamber being filled with a dielectric liquid and being pressure compensated against an ambient pressure;
receiving a signal of the optical signal and the electrical signal on one interface of the electrical interface and the optical interface of the media converter; and
transmitting the converted signal on the other interface of the electrical interface and the optical interface of the media converter.

19. A subsea cable termination assembly for a subsea cable that includes an optical fiber for data transmission, the subsea cable termination assembly comprising:
a chamber that has a liquid tight seal against an ambient medium surrounding the subsea cable termination assembly;
a media converter arranged in the chamber, the media converter comprising an optical interface and an electrical interface, the media converter configured to convert an optical signal received via the optical interface into an electrical signal and configured to convert an electrical signal received via the electrical interface into an optical signal, the optical interface being connectable to the optical fiber of the subsea cable; and
an electric contact arranged outside the chamber and electrically connected to the electrical interface of the media converter arranged inside the chamber,
wherein the media converter is configured to receive a signal of the optical signal and the electrical signal on one interface of the electrical interface and the optical interface and to transmit the converted signal on the other interface of the electrical interface and the optical interface, and
wherein the chamber is filled with a dielectric liquid and is pressure compensated against an ambient pressure.

20. A subsea connector comprising:
a connector element for mechanical and electrical engagement; and
a subsea cable termination assembly for a subsea cable that includes an optical fiber for data transmission, the subsea cable termination assembly comprising:
 a chamber that has a liquid tight seal against an ambient medium surrounding the subsea cable termination assembly;
 a media converter arranged in the chamber, the media converter comprising an optical interface and an electrical interface, the media converter configured to convert an optical signal received via the optical interface into an electrical signal and configured to convert an electrical signal received via the electrical interface into an optical signal, the optical interface being connectable to the optical fiber of the subsea cable; and
 an electric contact arranged outside the chamber and electrically connected to the electrical interface of the media converter arranged inside the chamber, wherein the media converter is configured to receive a signal of the optical signal and the electrical signal on one interface of the electrical interface and the optical interface and to transmit the converted signal on the other interface of the electrical interface and the optical interface, wherein the electric contact of the subsea cable termination assembly is a pin or an electrical socket of the connector element, and wherein the chamber is filled with a dielectric liquid and is pressure compensated against an ambient pressure.

21. A subsea cable assembly comprising:
a subsea cable including one or more optical fibers for data transmission;
a subsea connector comprising:
   a connector element for mechanical and electrical engagement; and
   a subsea cable termination assembly for the subsea cable, the subsea cable termination assembly comprising:
     a chamber that has a liquid tight seal against an ambient medium surrounding the subsea cable termination assembly;
     a media converter arranged in the chamber, the media converter comprising an optical interface and an electrical interface, the media converter configured to convert an optical signal received via the optical interface into an electrical signal and configured to convert an electrical signal received via the electrical interface into an optical signal, the optical interface being connectable to the optical fiber of the subsea cable; and
     an electric contact arranged outside the chamber and electrically connected to the electrical interface of the media converter arranged inside the chamber, wherein the media converter is configured to receive a signal of the optical signal and the electrical signal on one interface of the electrical interface and the optical interface and to transmit the converted signal on the other interface of the electrical interface and the optical interface, wherein the electric contact of the subsea cable termination assembly is a pin or an electrical socket of the connector element, wherein the cable termination assembly of the subsea connector is attached to the subsea cable at an end of the subsea cable and provides an optical connection of the one or more optical fibers to the media converter, and wherein the chamber is filled with a dielectric liquid and is pressure compensated against an ambient pressure.

22. The subsea cable termination assembly of claim 1, wherein the chamber is filled with a dielectric liquid and is pressure compensated against an ambient pressure.

* * * * *